United States Patent
Wagner et al.

(10) Patent No.: US 10,011,212 B2
(45) Date of Patent: Jul. 3, 2018

(54) FASTENING ARRANGEMENT IN A VEHICLE

(71) Applicant: VOLKSWAGEN AKTIENGESELLSCHAFT, Wolfsburg (DE)

(72) Inventors: Rolf Wagner, Ribbesbüttel (DE); Marcus Kuhlee, Spremberg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 15/308,063

(22) PCT Filed: Aug. 31, 2015

(86) PCT No.: PCT/EP2015/069865
§ 371 (c)(1),
(2) Date: Oct. 31, 2016

(87) PCT Pub. No.: WO2016/045912
PCT Pub. Date: Mar. 31, 2016

(65) Prior Publication Data
US 2017/0282780 A1 Oct. 5, 2017

(30) Foreign Application Priority Data
Sep. 23, 2014 (DE) ......... 10 2014 219 160

(51) Int. Cl.
*B60R 11/00* (2006.01)
*B60P 7/08* (2006.01)

(52) U.S. Cl.
CPC ......... *B60P 7/0807* (2013.01); *B60R 11/00* (2013.01)

(58) Field of Classification Search
CPC .. B60P 7/0807; B60P 7/00; B60P 7/08; B60R 11/00; B60R 2011/0003; B60R 2011/004;
(Continued)

(56) References Cited

U.S. PATENT DOCUMENTS 3,533,589 A * 10/1970 Schellmann ............ H01F 27/06 248/500
3,849,838 A * 11/1974 Hehl .......................... F16B 2/24 24/305
(Continued)

FOREIGN PATENT DOCUMENTS

CA    2 186 436 A1    3/1998
CA    2 372 829 A1    8/2003
(Continued)

OTHER PUBLICATIONS

Search Report for PCT International Patent Appl. No. PCT/EP2015/069865, dated Nov. 27, 2015.
(Continued)

*Primary Examiner* — Nkeisha Smith
(74) *Attorney, Agent, or Firm* — Pearl Cohen Zedek Latzer Baratz LLP

(57) ABSTRACT

The invention relates to a fastening fixture for a motor vehicle, comprising a sheet metal part (7) on the car body and a U-shaped bracket (1) attached thereto that has a crossbar (2) with adjoining U-shaped legs (3) from the ends of which foot sections (5) extend at an angle and engage underneath the sheet metal part (7) on the car body and are especially welded to it. According to the invention, the sheet metal part (7) has cutouts (8) that are separate from each other and spaced at the same distance as the two U-shaped legs (3) of the bracket (1), and the foot sections (5) of the U-shaped legs (3) pass through said cutouts (8).

7 Claims, 2 Drawing Sheets

(58) Field of Classification Search
CPC ..... B60R 2011/0036; B60R 2011/0029; B60R 2011/0015; B60R 2011/0017; B60R 2011/0059; B60R 2011/0052; B60R 2011/0064; B60R 2011/0066; B60R 2011/0071
USPC .............................. 248/231.9, 503, 505, 500
See application file for complete search history.

(56) References Cited

U.S. PATENT DOCUMENTS

| | | | | |
|---|---|---|---|---|
| 4,072,113 | A * | 2/1978 | Thurston | B60P 7/0876 24/115 K |
| 4,206,897 | A * | 6/1980 | Smith | H05K 3/301 248/505 |
| 4,531,869 | A * | 7/1985 | Hemmings | B60P 7/0807 410/107 |
| 4,623,206 | A * | 11/1986 | Fuller | H01M 2/1044 248/505 |
| 5,044,848 | A * | 9/1991 | Burnham | B60P 7/14 108/60 |
| 5,448,449 | A * | 9/1995 | Bright | H01L 23/4093 174/16.3 |
| 6,276,754 | B1 * | 8/2001 | Youssef-Agha | B60N 2/28 24/682.1 |
| 6,485,055 | B1 * | 11/2002 | Swayne | B60N 2/2806 280/801.1 |
| 6,767,057 | B2 * | 7/2004 | Neelis | B60N 2/289 297/216.11 |
| 6,827,169 | B1 * | 12/2004 | Van Hout | B60R 16/04 180/68.5 |
| 7,165,809 | B2 * | 1/2007 | Downey | B60N 2/2809 297/253 |
| 7,311,485 | B1 | 12/2007 | Langarica | |
| 7,357,206 | B2 * | 4/2008 | Fobean | B60R 16/04 180/68.5 |
| 7,382,622 | B2 * | 6/2008 | Li | H01L 23/4093 165/185 |
| 7,441,823 | B2 * | 10/2008 | Bertoli | B60N 2/2809 280/801.1 |
| 8,974,161 | B1 * | 3/2015 | Hemphill | B60P 7/0807 410/106 |
| 9,022,340 | B2 * | 5/2015 | McLeod | B60N 2/2887 248/500 |
| 9,511,705 | B1 * | 12/2016 | Egigian | B60P 7/0807 |
| 2002/0030378 | A1 | 3/2002 | Takahashi | |
| 2003/0015343 | A1 * | 1/2003 | Chen | H01L 23/4093 174/252 |
| 2004/0080193 | A1 * | 4/2004 | Tong | B60N 2/2893 297/250.1 |
| 2004/0080194 | A1 * | 4/2004 | Medvecky | B60N 2/2887 297/253 |
| 2004/0227384 | A1 | 11/2004 | Smallwood et al. | |
| 2008/0296461 | A1 * | 12/2008 | Tao | H01L 23/4093 248/500 |

FOREIGN PATENT DOCUMENTS

| | | |
|---|---|---|
| DE | 9 317 823 U1 | 2/1994 |
| DE | 10 2011 016 291 A1 | 10/2012 |
| DE | 10 2012 104 589 A1 | 12/2013 |
| EP | 2 384 925 A1 | 11/2011 |
| JP | 2001-213207 A | 8/2001 |
| JP | 2009 00 11 91 A | 1/2009 |
| WO | WO 03/070510 A1 | 8/2003 |

OTHER PUBLICATIONS

Office Action for Chinese Patent Application No. 201580010524.1, dated May 22, 2017.

* cited by examiner

FASTENING ARRANGEMENT IN A VEHICLE

CROSS-REFERENCE TO RELATED APPLICATIONS

This application is a National Phase Application of PCT International Application No. PCT/EP2015/069865, International Filing Date Aug. 31, 2015, claiming priority of German Patent Application No. 10 2014 219 160.2, filed Sep. 23, 2014, which is hereby incorporated by reference in its entirety.

FIELD OF THE INVENTION

The present invention relates to a fastening fixture for a vehicle.

BACKGROUND OF THE INVENTION

Such brackets serve, for instance, as lashing lugs in the cargo areas of motor vehicles in order to secure loads, as ISOfix brackets for the mounting of child seats, as brackets for backrest holders, etc., and consequently they have to have very high tensile strength. The brackets, usually made of steel, can be employed in holding plates or else directly in structural parts, whereby their bent foot sections advantageously engage behind the holding plates or structural parts. If the foot sections are bent in opposite directions, then there is a need, for instance, for a slot-shaped, relatively large cutout so that the bracket can be inserted "from the rear" and subsequently can be fastened to the holding plate or structural part, for example, by welding the foot sections.

German patent application DE 10 2011 016 291 A1 discloses a generic fastening fixture for a motor vehicle. This fixture has a sheet metal part on the car body and a U-shaped bracket attached thereto that is configured with a crossbar and adjoining U-shaped legs from the ends of which foot sections extend at an angle. The foot sections at the ends of the bracket extend underneath the sheet metal part on the car body and they are welded to it.

In the above-mentioned fastening fixture, both foot sections pass through a shared, slit-shaped, slot-like cutout which, owing to its geometry, reduces the fundamental stiffness of the sheet metal part. Moreover, the foot sections are not bent in opposite directions, but rather, they are bent in the same direction, so that they are only supported on the sheet metal part on one side, which is a drawback from the standpoint of force introduction.

The objective of the invention is to put forward a fastening fixture that exhibits increased strength and conceivably translates into a simplified installation practically without additional effort.

SUMMARY OF THE INVENTION

This objective is achieved by the features described herein. Advantageous embodiments of the invention are the subject matter of the description herein.

According to the invention, in order to improve the fundamental stiffness of the sheet metal part, the shared, slit-shaped or slot-like cutout has been eliminated. Instead, the sheet metal part according to the characterizing part of claim 1 has cutouts that are separate from each other and spaced at the same distance as the two U-shaped legs of the bracket, whereby the foot sections of the U-shaped legs pass through said cutouts. The foot sections of the U-shaped legs are preferably configured in such a way that the bracket can be inserted into the two cutouts by making a swiveling-tilting movement. In this manner, the bracket can be inserted "from the front" into the holding part, and can then be integrally bonded to it, particularly by means of resistance projection welding. The elimination of a slot in the sheet metal part greatly increases the strength of the connection.

The bracket can be made out of round stock in a known manner, whereby the cutouts are approximately 2 mm larger than the wire diameter. This ensures the requisite clearance for the swiveling-tilting movement when the bracket is being inserted. The cutouts can be, for example, circular or else they can have polygonal contours, that is to say, for instance, they can be configured as hexagonal holes.

The U-shaped legs and the crossbar of the bracket form a wire bracket plane from which the foot sections can protrude in opposite directions from each other, that is to say, they can be positioned on both sides. The positioning of the foot sections on both sides translates into a stable fixation of the bracket as well as into an improved force introduction in comparison to their being positioned on one side. Preferably, the foot sections can be bent away from the U-shaped legs by a bending angle of 90°. In this case, the foot sections are in a plane that is at a right angle to the wire bracket plane and can preferably be arranged parallel to each other.

When it comes to achieving a simple, smooth assembly sequence, the significant factors are the length of the foot sections, the cross sectional size of the cutouts and the positioning angle created between the foot sections and the bracket plane. For instance, at a positioning angle of 90°, the two foot sections can protrude from the wire bracket plane at a right angle. In this case, a greatly enlarged cross section of the cutouts in the sheet metal part is necessary in order to ensure a simple installation. Such an enlarged cross section of the cutouts, however, results in a reduced stiffness of the sheet metal part.

Before this backdrop, it is particularly preferred if the two foot sections are positioned in a staggered arrangement with respect to each other in which the two foot sections are turned. This means that each foot section is slanted in the direction of the opposite U-shaped leg, forming an acute angle with the wire bracket plane. The foot sections can form, for example, a positioning angle of, for instance, 15° to 60° with the bracket plane, and they can each be turned inwards. In this manner, the two foot sections are passed in a smooth insertion movement through the cutouts of the sheet metal part, which have a relatively small cutout cross section. For purposes of further simplifying the installation, both foot sections can be turned so as to be oriented parallel to each other and so that the brackets, which are thus symmetrically configured, can also be easily mounted the other way around.

In a known manner, the sheet metal part can be a holding plate which, after the bracket has been fastened, can be permanently connected to an adjoining structural part of the car body. As an alternative to this, the sheet metal part can be formed directly by a structural part of the car body.

The advantageous embodiments and/or refinements of the invention explained above and/or put forward in the subordinate claims can be employed individually or else in any desired combination with each other, except, for example, in those cases where there are obvious dependencies or incompatible alternatives.

BRIEF DESCRIPTION OF THE DRAWINGS

The following is shown.

DETAILED DESCRIPTION OF THE INVENTION

The bracket 1 shown in the figures is preferably made of a steel round wire having a defined diameter, and it has a straight crossbar 2, two U-shaped legs 3 that protrude perpendicularly from said crossbar and two foot sections 5 bent in opposite directions at an angle α of 90°. The length of the foot sections 5 can correspond approximately to the height of the U-shaped legs 3.

Figure 1:
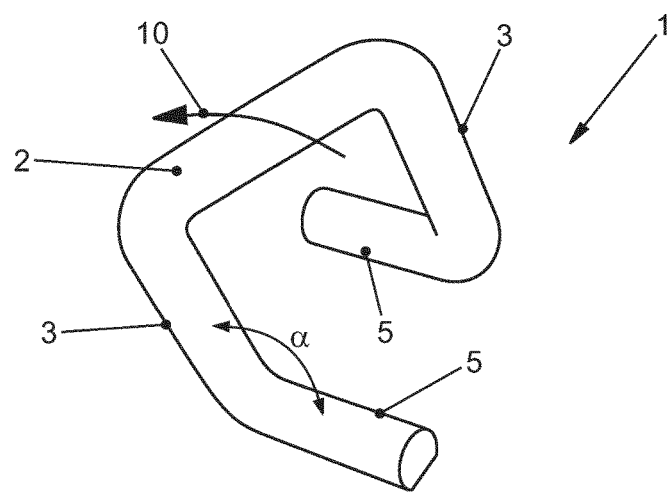
FIG. 1 shows a U-shaped bracket made of round wire, in a stereoscopic depiction, with a crossbar, two U-shaped legs that protrude perpendicular from said crossbar, and two foot sections bent by 90° relative to said U-shaped legs.
Figure 2:
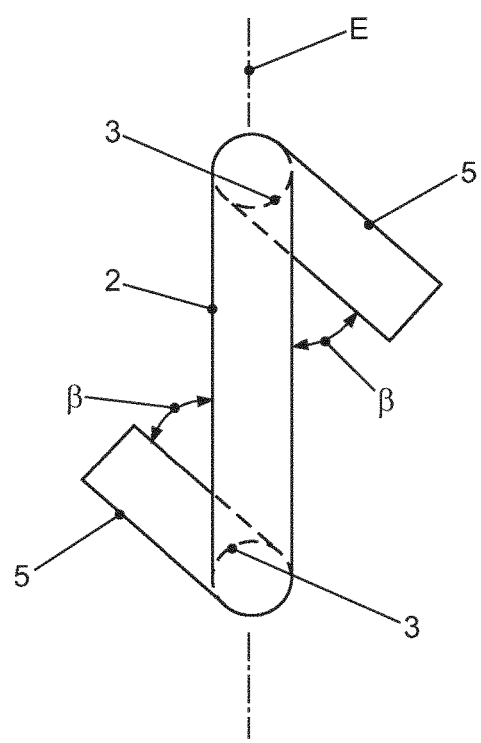
FIG. 2 shows the bracket in a side view.

As can be seen in FIG. 2, the U-shaped legs 3 and the crossbar 2 form a wire bracket plane E from which the foot sections 5 sections protrude in opposite directions from each other, that is to say, to both sides of the plane E. The foot sections 5 are bent away from the U-shaped legs 3 by a bending angle α of 90° (FIG. 1) and are arranged parallel to each other.

Moreover, the foot sections 5 in the figures are positioned in a staggered arrangement in which the foot sections 5 are at the positioning angle β (FIG. 2) of approximately 15° to 60°, especially of about 30° to 45°, and are turned so as to be oriented parallel to each other inwards (in the direction of the middle of the crossbar 2). This means that each of the two foot sections 5 is slanted in the direction of the opposite U-shaped leg 3 and forms an acute positioning angle β with the wire bracket plane E.

Figure 3:
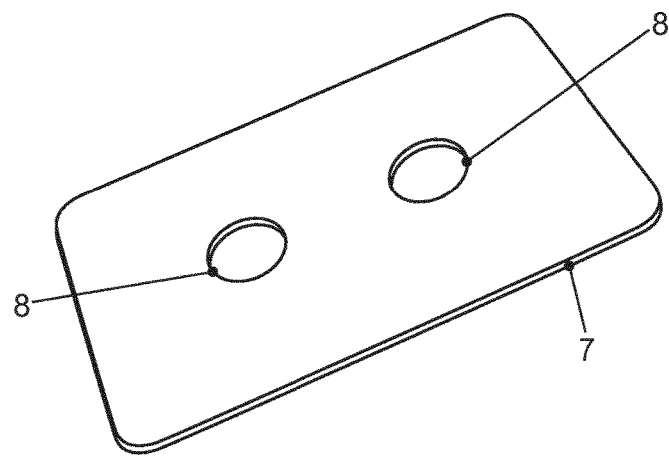
FIG. 3 shows the sheet metal part shown on its own as well with two circular-symmetrical cutouts for the insertion of the bracket.

In the flat sheet metal part 7 shown in FIG. 3, the bracket 1 is inserted into the position shown in FIG. 4 in a manner that will be described below.

For this purpose, two circular-symmetrical cutouts 8 that are spaced at the same distance as the U-shaped legs 3 are machined into the sheet metal part 7 by means of stamping, drilling, etc. The diameters of the cutouts 8 are approximately 2 mm larger than the outer diameter of the round wire of the bracket 1.

Moreover, the bending radii between the U-shaped legs 3 and the foot sections 5 are configured in such a way that the U-shaped legs 3 can be swiveled into the cutouts 8. The bracket 1 is inserted into the sheet metal part 7 as follows:

First of all, the bracket 1 is oriented in such a way that one of its foot sections 5 is oriented slanted relative to the sheet metal part 7; the crossbar 2 here is tilted upwards at a slant.

After the foot section 5 has been inserted into the cutout 8, the bracket 1 is swiveled around the bend between the inserted foot section 5 and the adjoining U-shaped leg 3, whereby the crossbar 2 moves outward, as indicated by the arrow 10 in FIG. 1.

This causes the other foot section 5 (which has not yet been inserted) of the bracket 1 to be swiveled into the area of the associated cutout 8 in the sheet metal part so as to be inserted into said cutout 8.

Figure 4:
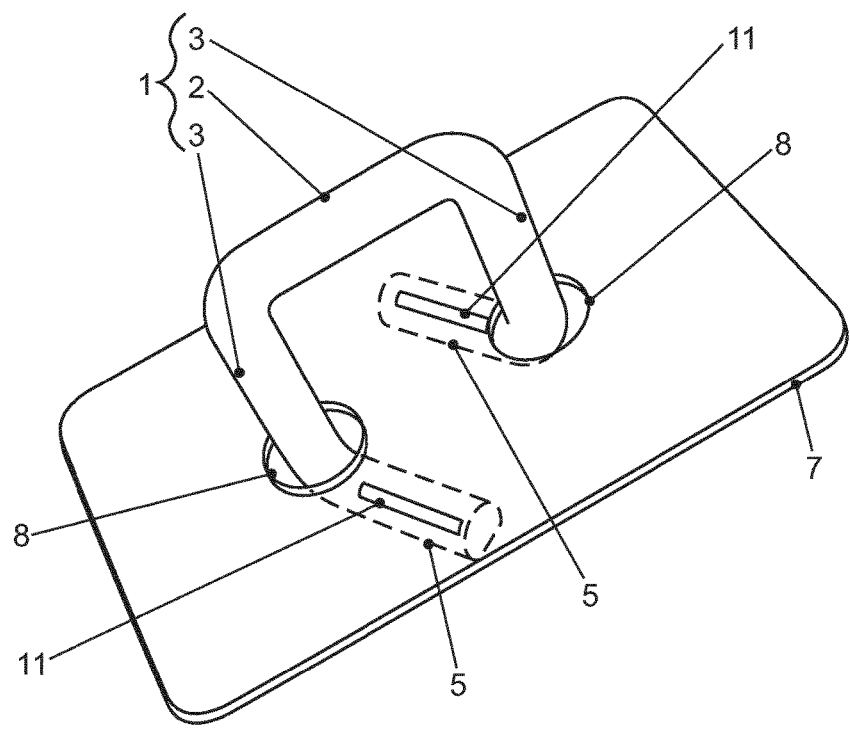
FIG. 4 shows the fastening fixture with the bracket and the sheet metal part in the completely mounted state.

Then the U-shaped legs 3 can be set upright via the bends towards the foot sections 5 in the direction opposite to that indicated by the arrow 10, and the bracket 1 can be swiveled into its final position shown in FIG. 4.

Subsequently, the foot sections 5 are integrally bonded to the sheet metal part 7, preferably by means of the familiar method of resistance projection welding (drawn lines 11).

The sheet metal part 7 can be subsequently fastened at the prescribed position to the car body, for example, by means of spot-welded connections. Diverging from the embodiment shown, the sheet metal part 7 can be a structural part of the car body.

The invention claimed is:

1. A fastening fixture for a motor vehicle, comprising:
   a sheet metal part on a body of the motor vehicle and a U-shaped bracket attached thereto,
   wherein the U-shaped bracket has a crossbar with adjoining legs that are spaced from each other by a distance and from ends of which foot sections extend at an angle and engage underneath the sheet metal part on the motor vehicle body,
   wherein the sheet metal part has cutouts that are separate from each other and are spaced at the spacing distance of the legs of the bracket, and the foot sections of the legs pass through said cutouts; and
   wherein the legs and the crossbar of the U-shaped bracket form a wire bracket plane, and the foot sections protrude from the legs in opposite directions with respect to the wire bracket plane.

2. The fastening fixture according to claim 1, wherein the bracket is made out of round stock, and wherein a cross section of both cutouts is larger than that of the round stock.

3. The fastening fixture according to claim 1, wherein the foot sections are bent away from the legs by a bending angle of 90°.

4. The fastening fixture according to claim 1, wherein the foot sections are in a plane that is at a right angle relative to the wire bracket plane and/or are arranged parallel to each other.

5. The fastening fixture according to claim 1, wherein the foot sections are positioned in a staggered arrangement with respect to each other in which each foot section is slanted in a direction opposite to a direction of another leg, forming an acute angle with the wire bracket plane.

6. The fastening fixture according to claim 1, wherein, after the bracket has been fastened, the sheet metal part can be permanently connected to an adjoining structural part of the motor vehicle body.

7. The fastening fixture according to claim 1, wherein, when the sheet metal part is in a structural part of the motor vehicle body, the bracket is inserted directly into a structural part of the motor vehicle body.

* * * * *